(12) United States Patent
Shamis et al.

(10) Patent No.: US 12,440,260 B2
(45) Date of Patent: Oct. 14, 2025

(54) HIGH POWER MULTIPLEXER WITH LOW POWER COMPONENTS

(71) Applicant: BIOSENSE WEBSTER (ISRAEL) LTD., Yokneam (IL)

(72) Inventors: Yuri Shamis, Haifa (IL); Assaf Govari, Haifa (IL); Andres Claudio Altmann, Haifa (IL); Lilah Marziano, Ganey-Tikva (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 743 days.

(21) Appl. No.: 17/841,784

(22) Filed: Jun. 16, 2022

(65) Prior Publication Data
US 2023/0404644 A1 Dec. 21, 2023

(51) Int. Cl.
*A61B 18/12* (2006.01)
*A61B 17/00* (2006.01)
(Continued)

(52) U.S. Cl.
CPC ..... *A61B 18/1206* (2013.01); *H03K 17/6285* (2013.01); *A61B 2017/00172* (2013.01);
(Continued)

(58) Field of Classification Search
CPC ...... A61B 18/1206; A61B 2017/00172; A61B 2018/00613; A61B 2018/00767;
(Continued)

(56) References Cited

U.S. PATENT DOCUMENTS

| 5,391,199 A | 2/1995 | Ben Haim |
| 6,117,660 A * | 9/2000 | Walters ................. C12N 13/00 435/173.6 |

(Continued)

FOREIGN PATENT DOCUMENTS

| CN | 112336448 A | 2/2021 |
| EP | 358336 A1 | 3/1990 |
| WO | WO1996005768 A1 | 2/1996 |

OTHER PUBLICATIONS

Cervinka et al., "High-Voltage Pulse Source for Cell Electroporation", Proceedings of the 12$^{th}$ International Conference on Mechatronics, 2017.
(Continued)

*Primary Examiner* — Sreeya Sreevatsa (57) ABSTRACT

A switching assembly for transferring trains of pulses, including a first terminal and a second terminal. A first plurality of first relays is connected in parallel, and have first contacts connected to the first assembly terminal, and second contacts. A first capacitor is connected in parallel with the first relays. A second plurality of second relays is connected in parallel, and have third contacts, and fourth contacts connected to the second assembly terminal. A second capacitor is connected in parallel with the second relays. A connection connects the second contacts to the third contacts. The pulses have amplitudes of at least 2 kilovolts. On activation of the first and second relays the first and second contacts connect and the third and fourth contacts connect, so that the first and second assembly terminals connect. On deactivation of the first and second relays the first and second assembly terminals disconnect.

20 Claims, 4 Drawing Sheets

(51) Int. Cl.
    *A61B 18/00*    (2006.01)
    *H03K 17/51*    (2006.01)
    *H03K 17/62*    (2006.01)

(52) U.S. Cl.
    CPC .............. *A61B 2018/00613* (2013.01); *A61B 2018/00767* (2013.01); *A61B 2018/124* (2013.01); *A61B 2018/126* (2013.01); *H03K 2017/515* (2013.01)

(58) Field of Classification Search
    CPC ........ A61B 2018/124; A61B 2018/126; A61B 2018/00702; A61B 2018/00761; A61B 2018/1253; A61B 18/12; A61B 18/00; H03K 17/6285; H03K 2017/515; H03K 3/64; H01H 47/02
    USPC ............................................ 361/139; 606/34
    See application file for complete search history.

(56) References Cited

U.S. PATENT DOCUMENTS

| | | | |
|---|---|---|---|
| 6,239,724 | B1 | 5/2001 | Doron |
| 6,332,089 | B1 | 12/2001 | Acker |
| 6,484,118 | B1 | 11/2002 | Govari |
| 6,618,612 | B1 | 9/2003 | Acker |
| 6,690,963 | B2 | 2/2004 | Ben Haim |
| 2002/0065455 | A1 | 5/2002 | Ben Haim |
| 2003/0120150 | A1 | 6/2003 | Govari |
| 2004/0068178 | A1 | 4/2004 | Govari |
| 2012/0116483 | A1* | 5/2012 | Yonezawa .......... A61N 1/36125 607/2 |
| 2013/0282079 | A1* | 10/2013 | Kallmyer ............ A61N 1/36125 607/62 |
| 2020/0289185 | A1* | 9/2020 | Forsyth .............. A61B 18/1477 |
| 2021/0022794 | A1 | 1/2021 | Viswanathan |
| 2021/0161592 | A1* | 6/2021 | Altmann ............. A61B 18/1492 |
| 2024/0216039 | A1* | 7/2024 | Panescu ............. A61B 18/1492 |

OTHER PUBLICATIONS

European Search Report for corresponding EPA No. 23179378.7 dated U.S. Appl. No. 11/062,023.

* cited by examiner

HIGH POWER MULTIPLEXER WITH LOW POWER COMPONENTS

FIELD OF THE DISCLOSURE

This disclosure relates generally to ablation used for surgery, and specifically to ablation performed using irreversible electroporation (IRE).

BACKGROUND

IRE is a soft tissue ablation technique that applies short pulses of strong electrical fields to create permanent and hence lethal nanopores in the cell membrane, thus disrupting the cellular homeostasis (internal physical and chemical conditions). Cell death following IRE results from apoptosis (programmed cell death) and not necrosis (cell injury, which results in the destruction of a cell through the action of its own enzymes) as in all other thermal or radiation-based ablation techniques. IRE is commonly used in tumor ablation in regions where precision and conservation of the extracellular matrix, blood flow and nerves are of importance. Some examples of systems using IRE are provided below.

U.S. Patent Application Publication No. 2021/0161592, to Altmann et al., describes an electrical signal generator that is stated to apply between one or more pairs of electrodes signals of first and second types in alternation. The signals of the first type comprise a sequence of bipolar pulses having an amplitude sufficient to cause irreversible electrophoresis in tissue contacted by the electrodes.

U.S. Patent Application Publication No. 2021/0022794, to Viswanathan, describes a generator that may include a set of electrode channels coupled to a set of electrodes during use. Each electrode channel from the set of electrode channels may include a first switch from a first set of switches and a second switch from a second set of switches. A set of energy sources may be coupled to a third set of switches. The third set of switches may be configured to switch from an off state to an on state to couple the set of energy sources to the set of electrodes.

Chinese Patent Application CN112336448A, to SHAN CHUNYU et al., describes an irreversible electroporation circuit that comprises an energy storage circuit, a first DC AC conversion circuit, an isolation transformation circuit, and an AC DC conversion circuit, which are connected in turn.

European Patent Application EP0358336A, to Boyd et al., describes a pulse generator that is stated to be adapted to produce a series of electrical pulses having a voltage of between 500 and 3600 Volts and a duration of between 5 and 500 microseconds. The pulses may be applied to trat tissue.

An article titled "High-Voltage Pulse Source for Cell Electroporation," by Červinka et al., in the 2017 proceedings of the 12th International Conference on Mechatronics, describes a development and test process of impulse power source for the purpose of delivering short high-voltage pulses into the treated tissue.

BRIEF DESCRIPTION OF THE DRAWINGS

The foregoing and other features and advantages of the disclosure will be apparent from the following, more particular description of preferred embodiments of the disclosure, as illustrated in the accompanying drawings.

DESCRIPTION OF EXAMPLES

Overview

The short electrical pulses that are used for IRE (irreversible electroporation) ablation are typically high voltage pulses, of the order of 1-2.5 kV, e.g., 2 kV, that transfer high currents, typically in the approximate range of 1-10 amperes, to tissue being ablated. The current transferred depends on the load, which typically ranges between 100-200 ohms. The pulses may be transferred between a pair of electrodes of a catheter, where each electrode is a single electrode. Alternatively, one or both electrodes may comprise multiple "sub-electrodes." Both electrodes are typically in proximity to the tissue being ablated, although in some cases only one electrode is proximate to the tissue, and the other electrode of the pair is distant from the tissue. For example, if the tissue being ablated is in the heart of a patient, the other electrode may be on the skin of the patient.

For the case where both electrodes are in proximity to the tissue being ablated, an IRE ablation procedure typically needs to have pulses transferred between multiple pairs of electrodes in different physical locations, so as to efficiently ablate a selected target region of the tissue. Where there are a large number of electrodes, this becomes problematic if the IRE generator has fewer channels than the number of electrodes, as may be the case in legacy situations. Consequently, the pulse delivery needs to be switched, or multiplexed, between the multiple pairs sequentially in time. While theoretically possible, such switching using switches is expensive, since the switches need to be rated for transferring high powers, i.e., need to be able to transfer, without being damaged, the high voltages and high currents referred to above. Typical low-cost relay switches are only rated for up to 1.5 kV. Devices that are rated for transferring high powers are also termed herein high-rated devices.

Examples of the present disclosure provide a multiplexer that may be used to efficiently switch high voltage/current IRE pulses between channels. The multiplexer comprises a controller controlling a plurality of switching assemblies, each assembly being comprised of multiple relays. Each relay in an assembly needs only to be rated for transferring low powers, i.e., only needs to be rated for a voltage and a current that are a fraction of the IRE pulse voltage and current. Devices that are rated for transferring low powers are also termed herein low-rated devices. Herein a low-rated device is assumed to be able to operate at no more than 1.5 kV, and to transfer no more than 2 amperes.

However, when configured as described hereinbelow, each assembly is high rated, i.e., taken together, the components of the assembly are able to transfer, without being damaged, the high voltages and currents associated with IRE pulses.

Each switching assembly is formed of sets of low-rated components. In one example, described hereinbelow, there are two sets, each set comprising a pair of double-pole single throw (DPST) low-rated relays connected in parallel. Each relay comprises respective first and second contacts, so that in each set all first contacts are connected together, and all second contacts are connected together. In each set a capacitor is connected in parallel with the pair of relays.

The switching assembly is formed by connecting the two sets in series, so that the second contacts of the first set connect to the first contacts of the second set. A first assembly terminal is connected to the first contacts of the first set, and a second assembly terminal is connected to the second contacts of the second set.

As is explained below, the switching assembly acts as a high-rated single pole single throw (SPST) relay, wherein the first and second assembly terminals are either connected or disconnected. Assembly terminals that are connected are also herein described as terminals that are closed, and assembly terminals that are disconnected are herein also described as terminals that are open.

Within the switching assembly the first set and the second set comprise respective power supplies driving the DPST relays of the set. The multiplexer controller activates the power supplies to connect all first and second contacts of the first set and all first and second contacts of the second set, so connecting the first and second assembly terminals. When the power supplies are deactivated, all first and second contacts of the first set and all first and second contacts of the second set disconnect so that the first and second terminals are disconnected. Relay contacts that are connected are also herein described as contacts that are closed, and relay contacts that are disconnected are herein also described as contacts that are open.

Typically, to maintain the high rating of the switching assembly the power sources of the first and second sets of components are isolated from each other. Electrodes on the catheter are isolated from the power sources to avoid unexpected surges in voltage and/or current from the power supply input.

In operation, power transferring between the first and the second assembly terminals is distributed between all the relays of the assembly. Because of the distribution, the current through each relay contact is a fraction, typically approximately 25% because of the four parallel current paths, of the IRE pulse current. Also because of the distribution and because of the capacitors, the voltage between each relay's first and second contacts is a fraction of the IRE pulse voltage; if the capacitors across each set of the assembly are equal, and if the impedance of the capacitors is significantly less than that of the relays, the voltage is approximately 50% of the IRE pulse voltage.

The example above assumes that DPST relays are used in the switching assembly. An alternative example uses two low rated SPST relays in place of each DPST relay, and those having ordinary skill in the art will be able to adapt the above description, mutatis mutandis, for forming the switching assembly using SPST relays.

To operate as a multiplexer, for example for a catheter having 30 electrodes, each electrode is connected to a respective switching assembly, and the assemblies are individually controlled by a controller.

System Description

Figure 1:
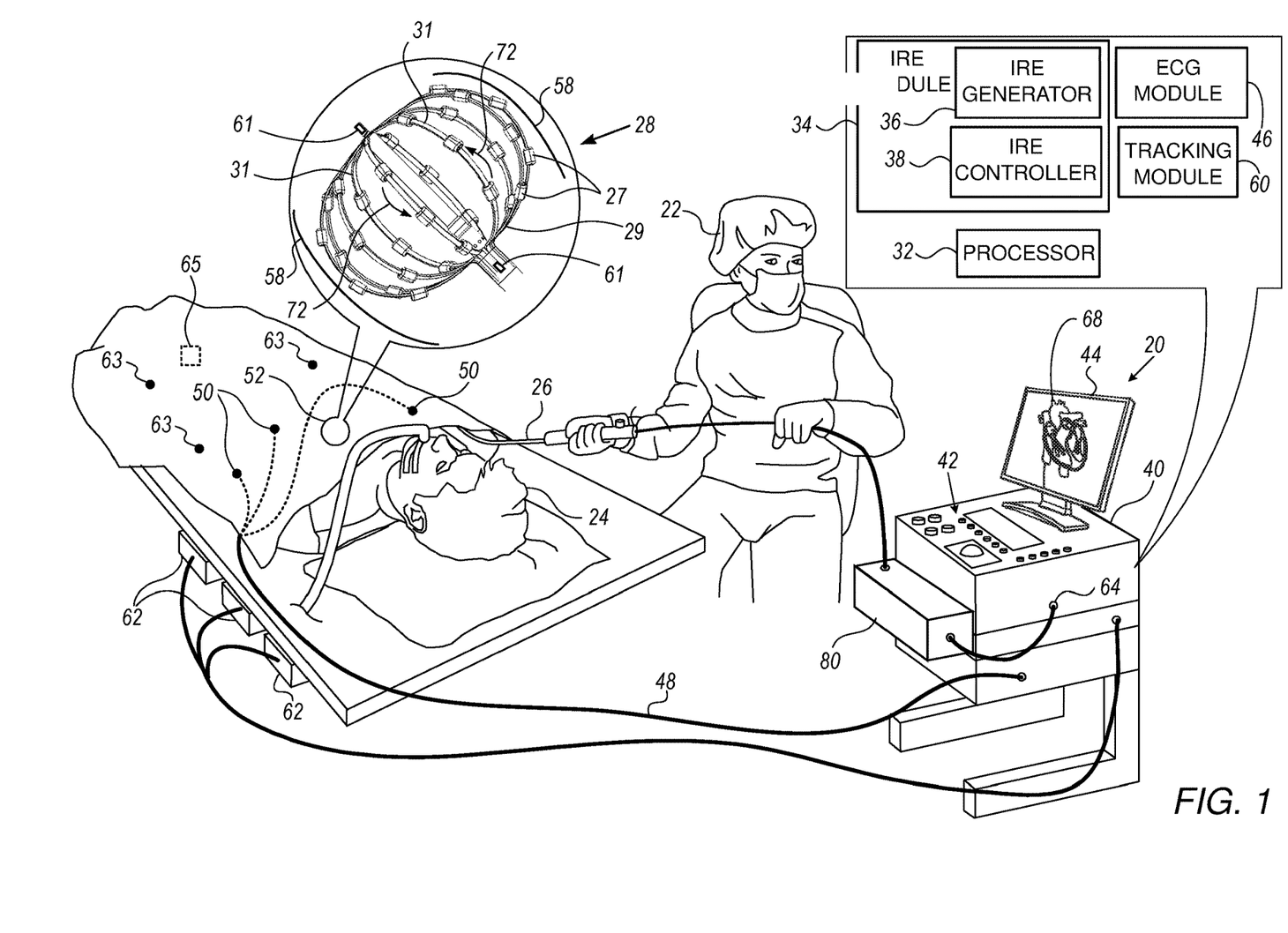
FIG. 1 is a schematic pictorial illustration of a multi-channel IRE (irreversible electroporation) system used in an IRE ablation procedure.

Reference is now made to FIG. 1, which is a schematic pictorial illustration of a multi-channel IRE (irreversible electroporation) system 20 used in an IRE ablation procedure. In the pictured example, a physician 22 performs a multi-channel IRE ablation procedure using IRE system 20.

Physician 22 performs the procedure on tissue 58 in a heart 52 of a subject 24, using an ablation catheter probe 26 having a distal end 28, herein by way of example assumed to comprise a basket catheter 29. Basket catheter 29 comprises multiple ablation electrodes 27 arranged along lengths of spines 31 of the catheter.

IRE system 20 comprises a processor 32 and an IRE module 34, and the IRE module comprises an IRE generator 36 and an IRE controller 38. An IRE generator similar to generator 36 is described in U.S. patent application Ser. No. 16/701,989. As is detailed below, IRE generator 36 generates trains of electrical pulses, which are directed to selected electrodes 27 so as to generate currents 72 therebetween, for performing an IRE procedure. The waveforms (timing and amplitude) of the trains of electrical pulses are controlled by IRE controller 38. A controller similar to controller 38 is also described in the above-referenced U.S. Patent Application.

Figure 2:
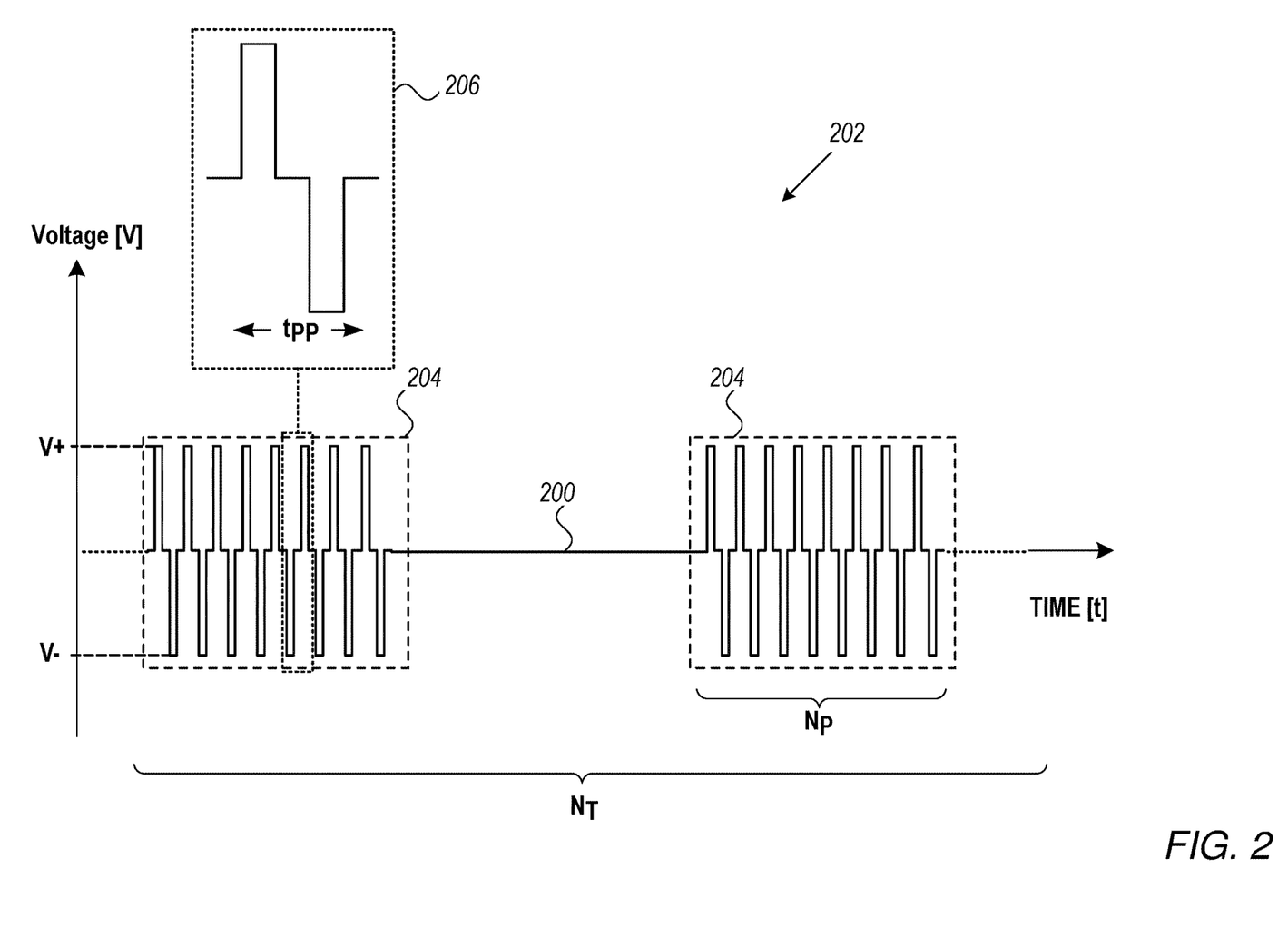
FIG. 2 is a schematic illustration of a voltage vs. time graph of trains of bipolar electrical pulses generated by an IRE generator.

FIG. 2 is a schematic illustration of a voltage vs. time graph 200 of trains of bipolar electrical pulses generated by IRE generator 36, according to an example of the present disclosure. Typically, pulses are conveyed between electrodes 27, comprising a transmit and a return electrode that are selected by multiplexer 80, and are in the form of one or more bursts 202 of pulses. Herein a burst comprises one or more trains 204 of individual bipolar pulses 206. In the figure, train 204 comprises eight individual pulses, but a train may comprise other than eight individual bipolar pulses.

Each pulse 206 has an amplitude of approximately 2000 V, 2500 V, or approximately 3000 V. I.e., for an amplitude of 3000V the potential V+ of a positive section of the bipolar pulse is +3000 V and the potential V− of a negative section of the pulse is −3000 V. In one example, the pulses from IRE generator 36 have a frequency of 480 kHz; in another example the frequency is 250 kHz. Typical ranges of values of pulse parameters, including values for the pulse amplitude and frequency, in pulses from IRE generator 36, are given in Table I below. From the values for the pulse amplitude it will be understood that the rating of multiplexer 80 needs to be at least 3000 V.

TABLE I

| Parameter | Symbol | Typical values |
|---|---|---|
| Pulse amplitudes | V+, V− | 500-3000 V |
| Period of bipolar pulses in a pulse train | $t_{PP}$ | 1-20 μs |
| Frequency of pulses | | 50 kHz-1 MHz |
| Number of bipolar pulses in a pulse train | $N_P$ | 1-100 |
| Number of pulse trains in a burst | $N_T$ | 1-100 |

Returning to FIG. 1, processor 32 and IRE controller 38 each typically comprise a programmable processor, which is programmed in software and/or firmware to carry out the functions that are described herein. Alternatively or additionally, the processors and the controller may comprise hard-wired and/or programmable hardware logic circuits, which perform at least some of these functions. Although processor 32 and IRE controller 38 are shown in the figures, for the sake of simplicity, as separate, monolithic functional blocks, in practice some of these functions may be combined in a single processing and control unit. In some examples, IRE controller 38 resides within IRE module 34, since typically high-speed control signals are transmitted from the IRE controller to IRE generator 36. However, provided that signals at sufficiently high speeds may be transmitted from processor 32 to IRE generator 36, IRE controller 38 may reside within the processor.

Processor 32 and IRE module 34 typically reside within a console 40. Console 40 comprises input devices 42, such as a keyboard and a mouse, operated by physician 22. A display screen 44 is located in proximity to console 40. The screen 44 may be utilized to display an image of the heart 68. Display screen 44 may optionally comprise a touch screen, thus providing another input device.

IRE system 20 may additionally comprise one or more of the following modules (typically residing within console 49):

- An electrocardiogram (ECG) module 46 is coupled through a cable 48 to ECG electrodes 50, which are attached to subject 24. ECG module 46 is configured to measure the electrical activity of heart 52 of subject 24.
- A tracking module 60 is coupled to one or more electromagnetic position sensors 61 in basket catheter 29. In the presence of an external magnetic field generated by magnetic-field generators 62, the electromagnetic position sensors output signals that vary with the positions of the sensors. Based on these signals, tracking module 60 may ascertain the positions of electrodes 27 in heart 52.
- A method of position tracking using external magnetic fields is implemented in the CARTO™ system, produced by Biosense Webster Inc. (Irvine, Calif.) and is described in detail in U.S. Pat. Nos. 5,391,199, 6,690,963, 6,484,118, 6,239,724, 6,618,612 and 6,332,089, in PCT Patent Publication WO 96/05768, and in U.S. Patent Application Publication Nos. 2002/0065455 A1, 2003/0120150 A1 and 2004/0068178 A1.
- Alternatively or additionally, module 60 may use a tracking system based on currents transferred through, or impedances seen by, electrodes 27. In such a system module 60 estimates the position of a given electrode 27 in response to currents or impedances between the given electrode and a plurality of surface-electrodes 63 that are attached to the skin of subject 24. An Advanced Current Location (ACL) system, made by Biosense-Webster (Irvine, Calif.), which is described in U.S. Pat. No. 8,456,182, is such a tracking system.

Figure 3:
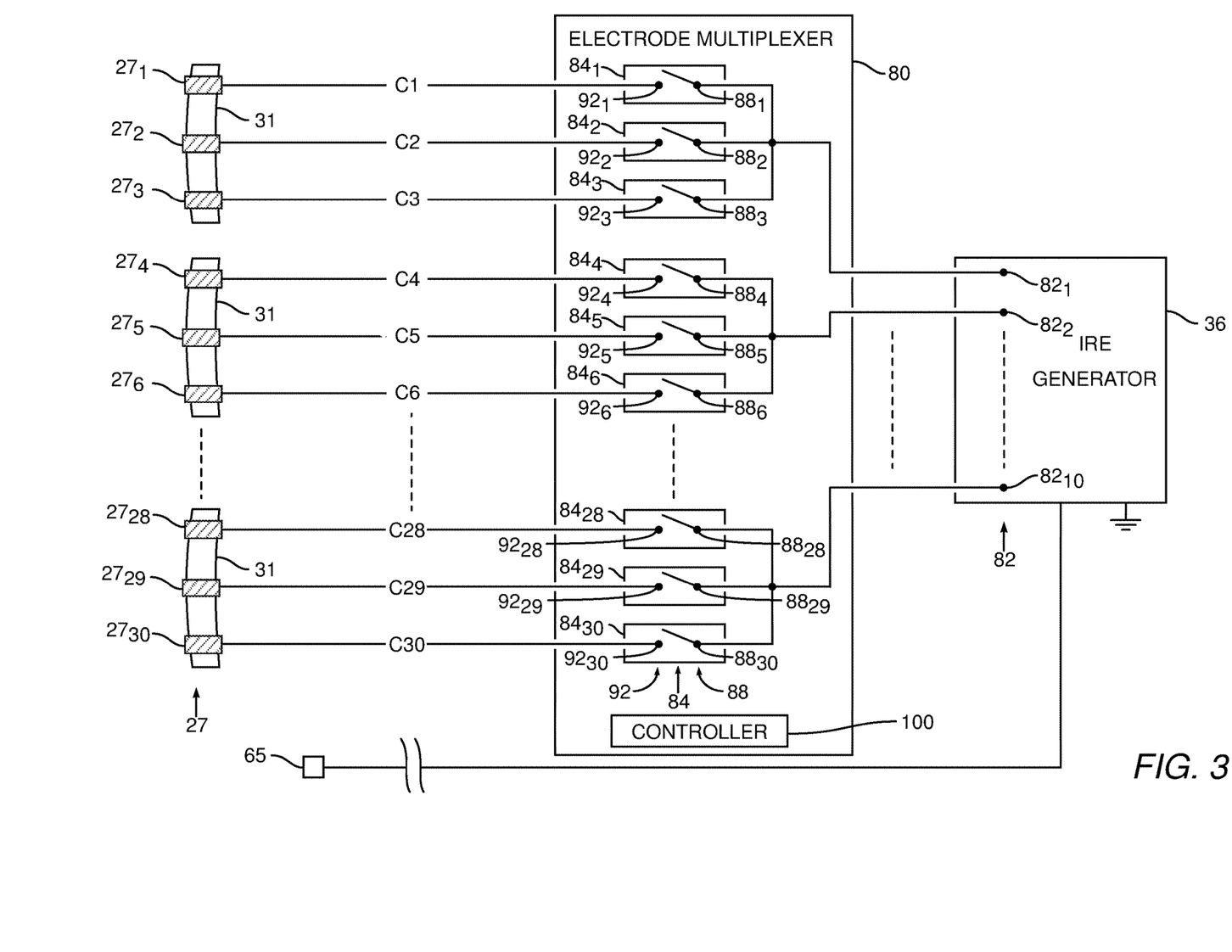
FIG. 3 is a schematic diagram of a multiplexer and its connections to the IRE generator and electrodes.
Figure 4:
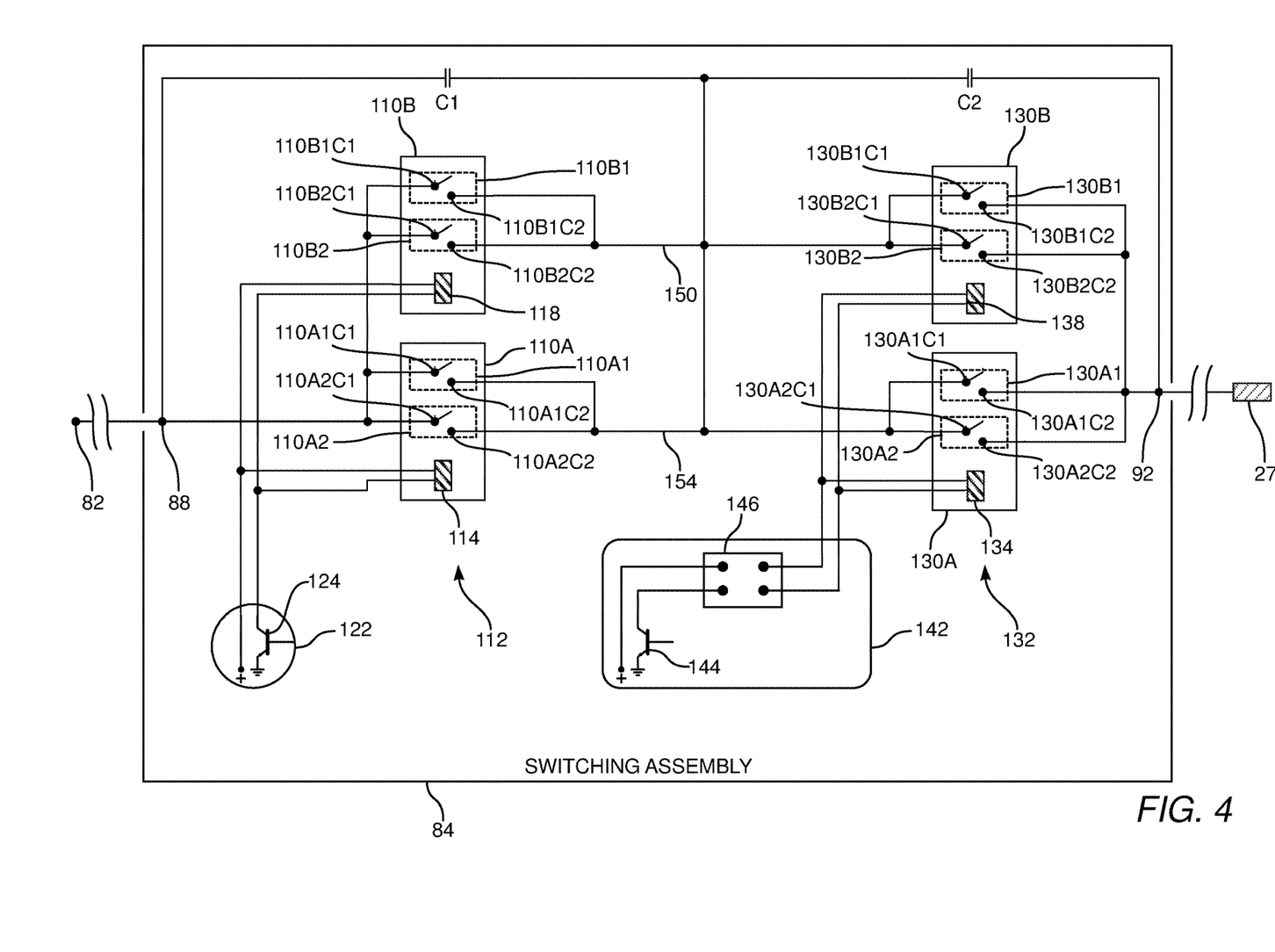
FIG. 4 is a schematic diagram illustrating the internal structure of a switching assembly.

Probe 26 is coupled to console 40 via an electrode multiplexer 80, described in more detail with respect to FIGS. 3 and 4. IRE signals are thus transferred between IRE generator 36 and electrodes 27 of basket catheter 29 via multiplexer 80. Similarly, other signals from electrodes 27, such as ECG signals, and/or those that may be used for tracking the position of the electrodes of basket catheter 29 using an ACL system referred to above, may be received by processor 32 via multiplexer 80.

An external electrode 65, or "return patch", may be additionally coupled externally between subject 24, typically on the skin of the subject's torso, and IRE generator 36. While IRE signals are typically generated so that IRE current flows between electrodes 27, in some cases the IRE current may be configured to flow between one or more electrodes 27 and external electrode 65.

FIG. 3 is a schematic diagram of multiplexer 80 and its connections to IRE generator 36 and electrodes 27. In the following description IRE generator 36 is assumed to comprise 10 channels 82, each of which may be configured to transmit or receive IRE signals from the generator. As is explained below, the 10 channels are multiplexed to 30 electrode channels C1-C30 connected to electrodes 27 that are located on spines 31. Hereinbelow, individual elements of entities in the figure are identified, as necessary, by having an added subscript. For example, different channels 82 are identified with an added subscript $82_n$, where n is an integer from 1 to 10, and different electrodes 27 are identified with an added subscript $27_m$, where m is an integer from 1 to 30.

While for simplicity and clarity multiplexer 80 is assumed to multiplex the 10 channels of the IRE generator to the 30 electrodes of catheter 29, those having ordinary skill in the art will be able to adapt the description, mutatis mutandis, for multiplexers that operate on numbers of channels that are larger or smaller than 10, and/or that connect to numbers of electrodes that are larger or smaller than 30, and all such multiplexers are assumed to be comprised within the scope of the present disclosure.

Multiplexer 82 comprises 30 switching assemblies 84, each of which acts as a single pole single throw (SPST) relay that is high rated. In the description and in the claims, the term high-rated when applied to an electrical element is assumed to mean that the element is rated to transfer high power IRE pulses, i.e., is able to transfer and operate with, without being damaged, the high voltages of at least 2 kV, typically up to 3 kV, and currents of up to 10 amps associated with IRE pulses.

Each switching assembly 84 has two terminals, a first terminal 88 and a second terminal 92, that are switched between an open state, when the two terminals do not connect, and a closed state, when the two terminals connect. Each second terminal 92 is connected to a respective electrode 27. For example, terminal $92_3$ of switching assembly $84_3$ is connected to electrode $27_3$.

In the example illustrated in FIG. 3, first terminals 88 of groups of three assemblies 84 are connected to a single channel 82 of IRE generator 36. Thus, terminals $88_1$, $88_2$, and $88_3$ are connected to channel $82_1$; terminals $88_4$, $88_5$, and $88_6$ are connected to channel $82_2$; ... and terminals $88_{28}$, $88_{29}$, and $88_{30}$ are connected to channel $82_{10}$.

Multiplexer 80 also comprises a controller 100, which has processing capability and which is configured to operate each of assemblies 84, typically according to an IRE ablation protocol that is chosen by professional 22. The protocol typically selects assemblies 84 so as to activate electrodes connected to the assemblies, and the selection is according to the tissue being ablated. Alternatively or additionally, at least some of the functions of controller 100 may be performed by processor 32.

Typically, during an IRE procedure, generator 36 is configured to use at least two channels 82 for a given set of IRE pulses, one as a transmit channel and one as a receive channel. Since the channels are connected to electrodes 27, which are in proximity to tissue of the patient, in this configuration the IRE pulses from the generator perform bipolar ablation. In some examples, the IRE generator may be configured to use its channels only as transmit channels, and a return path for the pulses in this case is via external electrode 65 which is connected to the ground of generator 36. In this configuration the IRE pulses perform unipolar ablation.

It will be understood that the example depicted in FIG. 3, wherein three electrodes 27 on one spine 27 are multiplexed together, is but one example of electrodes that are multiplexed, and that other arrangements of three electrodes being multiplexed together will be apparent to those having ordinary skill in the art, and are comprised within the scope of the present disclosure. For example, each of the three electrodes may be on different spines, or two of the electrodes may be on one spine and the third electrode may be on a second spine. It will also be understood that combinations and sub-combinations of such arrangements are comprised within the scope of the present disclosure. For example one set of three multiplexed electrodes may be on one spine, and a second set may have two electrodes on another spine and a third electrode on yet another spine.

It will also be understood that while the example depicted in FIG. 3 shows ten sets of three electrodes that are multiplexed together, the scope of the present disclosure comprises sets of any plurality of two or more electrodes that are multiplexed together. For example, the thirty electrodes illustrated in FIG. 3 may be grouped into three sets of four electrodes, four sets of three electrodes, and three sets of two electrodes. In this case multiplexer 80 is configured so that the electrodes in each set are multiplexed together, by having terminals 88 of the respective sets connected to each other, and to a channel of the generator. (E.g., terminals $88_1$, $88_2$, $88_3$, and $88_4$ may be connected to channel $82_1$.)

FIG. 4 is a schematic diagram illustrating the internal structure of switching assembly 84. As shown in the figure first terminal 88 of the assembly is connected externally to a channel 82 of the IRE generator, and second terminal 92 of the assembly is connected externally to an electrode 27 of probe 26.

The assembly comprises a first pair of double pole single throw (DPST) relays 110A, 110B, herein also termed DPST 110A and DPST 110B. DPST 110A is formed of two single pole single throw (SPST) relays 110A1, 110A2, herein just termed relays, activated by a single coil. Both relays have two contacts: first relay 110A1 comprises a first contact 110A1C1 and a second contact 110A1C2; second relay 110A2 also comprises a first contact 110A2C1 and a second contact 110A2C2. Both relays 110A1 and 110A2 of DPST 110A are activated by a coil 114.

DPST 110B is substantially similar to DPST 110A, having a first relay 110B1 comprising a first contact 110B1C1 and a second contact 110B1C2, and a second relay 110B2 having a first contact 110B2C1 and a second contact 110B2C2. Both relays 110B1 and 110B2 of DPST 110B are activated by a coil 118.

DPST 110A and 110B are connected to each other in parallel, so that all first contacts 110A1C1, 110A2C1, 110B1C1, and 110B2C1 are connected together and so that all second contacts 110A1C2, 110A2C2, 110B1C2, and 110B2C2 are connected together. First contacts 110A1C1, 110A2C1, 110B1C1, and 110B2C1 are also connected to first terminal 88 of the switching assembly. In addition, coils 114 and 118 are connected to a common power source 122 which operates DPST 110A and 110B. Power source 122 may be any convenient power source that can be operated by controller 100. Herein, power source 122 is assumed to derive its power from a positive voltage rail and to be coupled via a switching transistor 124 to ground. The transistor may be activated and de-activated by controller 100.

A capacitor C1 is connected in parallel with first pair of DPST relays 110A, 110B. DPST relays 110A, 110B, together their parallel capacitor C1 are herein termed a first set 112 of components of assembly 84.

In the example illustrated relays 110A1, 110A2, 110B1, and 110B2 are all normally open. Thus, on activation of power source 122 all second contacts of the relays connect to the first contacts of the relays, and thus to terminal 88. On deactivation of power source 122 terminal 88 disconnects from the second contacts of the relays.

The assembly also comprises a second pair of substantially similar DPST relays 130A, 130B. DPST relays 130A, 130B are also termed DPST 130A and 130B. DPST 130A has two relays each having two contacts: a first relay 130A1 comprises a first contact 130A1C1 and a second contact 130A1C2; a second relay 130A2 also comprises a first contact 130A2C1 and a second contact 130A2C2. Both relays 130A1 and 130A2 of DPST 110A are activated by a coil 134.

As stated above DPST 130B is substantially similar to DPST 130A, having a first relay 130B1 comprising a first contact 130B1C1 and a second contact 130B1C2, and a second relay 130B2 having a first contact 130B2C1 and a second contact 130B2C2. Both relays 130B1 and 130B2 of DPST 130B are activated by a coil 138.

As for DPST 110A and 110B, DPST 130A and 130B are connected to each other in parallel, so that all first contacts 130A1C1, 130A2C1, 130B1C1, and 130B2C1 are connected together and so that all second contacts 130A1C2, 130A2C2, 130B1C2, and 130B2C2 are connected together. Second contacts 130A1C2, 130A2C2, 130B1C2, and 130B2C2 are also connected to second terminal 92 of the switching assembly. In addition, coils 134 and 138 are connected to a common power source 142. As for power source 122, power source 142 is assumed to derive its power from the positive voltage rail and to be coupled via a switching transistor 144 to ground. Transistor 144 may be activated and de-activated by controller 100.

Power source 142 delivers its power to DPST 130A and 130B via an isolator 146, typically an opto-isolator. Thus, the power delivered by power source 122 is electrically isolated from the power delivered by power source 142, so that coils 134 and 138 are electrically isolated from coils 114 and 118. The isolation prevents the possibility of breakdown between the first and the second sets of low-rated components and protects the basket catheter 29 from exposure to an unexpected surge in current or voltage.

A capacitor C2 is connected in parallel with second pair of DPST relays 130A, 130B. DPST relays 130A, 130B, together their parallel capacitor C2 are herein termed a second set 132 of components of assembly 84. Typically, C1 and C2 have equal capacitances, and in one example C1 and C2 are each 5 pF.

DPST 110A and 110B of first set 112 and DPST 130A and 130B of second set 132 are all rated to convey RMS currents up to 2 A, and to support RMS voltages up to 1.5 kV. Compared with the IRE pulses that the assembly may be conveying, having currents of up to 5 A and voltages of up to 3 kV, the relays of the first and second sets are low rated.

Relays 130A1, 130A2, 130B1, and 130B2 are all normally open. Thus, on activation of power source 142 all first contacts of the relays connect to the second contacts of the relays, and thus to terminal 92. On deactivation of power source 142 terminal 92 disconnects from the first contacts of the relays.

First pair of DPST relays 110A, 110B are connected in series to second pair of DPST relays 130A, 130B by connections 150, 154. Thus contacts 110A1C2, 110A2C2, 110B1C2, and 110B2C2 of the first pair are connected to contacts 130A1C1, 130A2C1, 130B1C1, and 130B2C1 of the second pair.

In assembly 84 a capacitor C1 is connected in parallel with first pair of DPST relays 110A, 110B and a capacitor C2 is connected in parallel with second pair of DPST relays 130A, 130B. Typically, C1 and C2 have equal capacitances, and in one example C1 and C2 are each 5 pF.

In multiplexer 80, each switching assembly 84 is activated and deactivated independently by controller 100. The activation of a given assembly 84 comprises the controller simultaneously powering PS 122 and PS 142 of the assembly on, thereby closing the contacts of all the relays of the first pair of DPST relays 110A, 110B and closing the contacts of all the relays of the second pair of DPST relays 130A, 130B. The closing of all the relays connects first terminal 88 of the assembly to second terminal 92 of the assembly, and thus connects the channel 82 and the electrode 27 connected to the assembly.

The simultaneous closing of all the contacts, and the parallel configuration of each of the first and second pairs of DPST relays, means that the current of signals transferred through assembly 84 is distributed, approximately evenly, between all the SPST relays of the assembly. Thus each DPST relay in each pair may be rated to operate with a fraction, approximately 50%, of the current transferred through the assembly.

The deactivation of a given assembly comprises the controller simultaneously powering source 122 and source 142 of the assembly off, thereby opening the contacts of all the relays of the first pair of DPST relays 110A, 110B and opening the contacts of all the relays of the second pair of DPST relays 130A, 130B. The opening of all the relays disconnects first terminal 88 of the assembly from second terminal 92 of the assembly, and thus disconnects the channel 82 connected to the assembly from the electrode 27 connected to the assembly.

The simultaneous opening of all the contacts, and the series connection of the first pair of relays to the second pair, causes the voltage of signals from channel 82 of the IRE generator to be developed between terminals 88 and 92 of the assembly 84. The signals are alternating current (AC) signals, so that, absent capacitors C1 and C2, the voltage distribution across the relays is proportional to the ratio of the capacities of the open contacts of the relays. The open contact capacity of each of the relays is typically unknown, but is approximately 1 pF or less. The possibility of the open capacity capacitances being unequal means that the voltage across one of the pairs may exceed the voltage rating of the relays in the pair, so causing those relays to breakdown.

Connecting capacitors C1 and C2 respectively in parallel to the first and second pairs of relays, selecting the capacitance of the capacitors to be larger, by at least a factor of five, than the capacitance of the open contacts of the pair they are in parallel with, and having the capacitances to be approximately equal, ensures that the voltage across each pair of relays is a fraction, approximately 50%, of the signal voltage. Selecting capacitors C1 and C2 to have capacitances significantly larger than the open contact capacitance of the relays ensures that the capacitor impedance is significantly less than the impedance of the relays. Consequently, the voltage division is determined by the capacitance ratio of C1 to C2. Thus, capacitors C1 and C2 ensure that the relays may have a voltage rating less than that of the signal voltage to prevent the relays from breaking down.

Thus each DPST relay in each pair may be rated to operate with a fraction, approximately at least 50%, of the voltage developed across the assembly. Thus, for relays with a given rating, the pulses transferred by the assembly may have amplitudes significantly greater than the relay rating, typically at least 150% of the rating. This is the case since the pulse voltage is developed across both pairs of relays.

The description of the example switching assembly illustrated in FIG. 4 assumes two pairs of DPST relays connected in series. However, it will be understood that the scope of the present disclosure includes other types and groups of relays connected in a similar configuration, so as to distribute the total current flowing through, and the overall voltage developed across, an assembly, so that the ratings of the relays in the assembly can be a fraction of the total current and overall voltage.

As a first example, at least one group of relays may comprise two or more SPST relays connected in parallel, and a capacitor may be connected in parallel with the group. As a second example, at least one group of relays may comprise combinations of different types of relays, such as an SPST relay and a DPST relay connected in parallel, with a capacitor also connected in parallel. As a third example, more than two groups of relays may be connected in series.

The description above assumes that single throw relays, i.e., SPST and DPST relays, are used in a switching assembly. It will be understood that double throw relays, such as SPDT (single pole double throw) relays and DPDT (double pole double throw) relays can be configured as single throw relays, and that this is also true of relays having more than two throws. Thus the scope of the present disclosure comprises any relays that may be configured as single throw relays.

As used herein, the terms "about" or "approximately" for any numerical values or ranges of an entity indicate a suitable dimensional tolerance that allows the entity to function for its intended purpose as described herein. More specifically, "about" or "approximately" may refer to the range of values ±10% of the recited value, e.g. "about 80%" may refer to the range of values from 72% to 88%.

EXAMPLES

Example 1

A switching assembly (84) for transferring trains of pulses, comprising:
a first assembly terminal (88) and a second assembly terminal (92);
a first plurality of first relays (110A, 110B) connected in parallel, whereby the first relays have respective first contacts (110A1C1, 110A2C1, 110B1C1, 110B2C1) connected together and have respective second contacts (110A1C2, 110A2C2, 110B1C2, 110B2C2) connected together, and wherein the respective first contacts are connected to the first assembly terminal;
a first capacitor (C1) connected in parallel with the first plurality of first relays;
a second plurality of second relays (130A, 130B) connected in parallel, whereby the second relays have respective third contacts (130A1C1, 130A2C1, 130B1C1, 130B2C1) connected together and have respective fourth contacts {130A1C2, 130A2C2, 130B1C2, 130B2C2) connected together, and wherein the respective fourth contacts are connected to the second assembly terminal;
a second capacitor (C2) connected in parallel with the second plurality of second relays; and
a connection (150), having a first termination connected to the respective second contacts and a second termination connected to the respective third contacts, so that the first plurality of first relays and the second plurality of second relays are connected in series,
wherein the pulses have amplitudes of at least 2 kilovolts, and
whereby on activation of the first plurality of first relays and the second plurality of second relays the respective first and second contacts connect and the respective third and the fourth contacts connect, thereby connecting the first and second assembly terminals, and on deactivation of the first plurality of first relays and the second plurality of second relays the respective first and second contacts disconnect and the respective third and the fourth contacts disconnect, thereby disconnecting the first and second assembly terminals.

Example 2

The switching assembly according to example 1, wherein at least one of the first relays is configured as a single throw relay.

Example 3

The switching assembly according to example 2, wherein the at least one of the first relays comprises one of a single pole relay and a double pole relay.

Example 4

The switching assembly according to example 1, wherein at least one of the second relays is configured as a single throw relay.

Example 5

The switching assembly according to example 4, wherein the at least one of the second relays comprises one of a single pole relay and a double pole relay.

Example 6

The switching assembly according to example 1, and comprising a first power source configured to operate the first plurality of first relays, and a second power source configured to operate the second plurality of second relays, wherein a first power delivered by the first power source to the first plurality of relays is electrically isolated from a second power delivered by the second power source to the second plurality of relays.

Example 7

The switching assembly according to example 1, wherein the first relays and the second relays are rated at a preset voltage, and wherein the amplitude of the pulses is greater than 150% of the preset voltage.

Example 8

A multiplexer (80) for transferring trains of pulses, comprising:
  a plurality of switching assemblies (84), each switching assembly comprising:
  a first assembly terminal (88) and a second assembly terminal (92);
  a first plurality of relays (110A, 110B) connected in parallel by having respective first contacts (110A1C1, 110A2C1, 110B1C1, 110B2C1) connected together and respective second contacts (110A1C2, 110A2C2, 110B1C2, 110B2C2) connected together and wherein the respective second contacts are connected to the first assembly terminal;

a first capacitor (C1) connected in parallel with the first plurality of relays;
a second plurality of relays (130A, 130B) connected in parallel by having respective third contacts (130A1C1, 130A2C1, 130B1C1, 130B2C1) connected together and respective fourth contacts {130A1C2, 130A2C2, 130B1C2, 130B2C2) connected together and wherein the respective fourth contacts are connected to the second assembly terminal;
a second capacitor (C2) connected in parallel with the second plurality of relays; and
a connection (150), having a first termination connected to the respective first contacts and a second termination connected to the respective third contacts, so that the first plurality of relays and the second plurality of relays are connected in series; and
a controller (100) configured to independently activate the switching assemblies so that on activation of a given switching assembly the first and the second contacts thereof connect and the third and the fourth contacts thereof connect, thereby connecting the first and second assembly terminals so that the pulses transfer therebetween, and on deactivation of the given switching assembly the first and the second contacts thereof disconnect and the third and the fourth contacts thereof disconnect, thereby disconnecting the first and second assembly terminals so that the pulses do not transfer therebetween,
wherein the pulses have amplitudes of at least 2 kilovolts.

Example 9

The multiplexer according to example 8, wherein the plurality of switching assemblies comprises a first switching assembly and a second switching assembly, and wherein the first assembly terminal of the first switching assembly is connected to the first assembly terminal of the second switching assembly.

Example 10

The multiplexer according to example 8, and comprising a plurality of electrodes respectively connected to the first plurality of switching assemblies, and an irreversible electroporation generator having fewer channels than the first plurality of switching assemblies, each channel being respectively connected to one of the switching assemblies.

Example 11

A method for transferring trains of pulses, comprising:
  providing a switching assembly (84) having a first assembly terminal (88) and a second assembly terminal (92);
  connecting a first plurality of first relays (110A, 110B) in parallel, whereby the first relays have respective first contacts (110A1C1, 110A2C1, 110B1C1, 110B2C1) connected together and have respective second contacts (110A1C2, 110A2C2, 110B1C2, 110B2C2) connected together, and wherein the respective first contacts are connected to the first assembly terminal;
  connecting a first capacitor (C1) in parallel with the first plurality of first relays;
  connecting a second plurality of second relays (130A, 130B) in parallel, whereby the second relays have respective third contacts (130A1C1, 130A2C1, 130B1C1, 130B2C1) connected together and have respective fourth contacts {130A1C2, 130A2C2, 130B1C2, 130B2C2) connected together, and wherein the respective fourth contacts are connected to the second assembly terminal;

connecting a second capacitor (C2) in parallel with the second plurality of second relays; and providing a connection (150), having a first termination connected to the respective second contacts and a second termination connected to the respective third contacts, so that the first plurality of first relays and the second plurality of second relays are connected in series, wherein the pulses have amplitudes of at least 2 kilovolts, and whereby on activation of the first plurality of first relays and the second plurality of second relays the respective first and second contacts connect and the respective third and the fourth contacts connect, thereby connecting the first and second assembly terminals, and on deactivation of the first plurality of first relays and the second plurality of second relays the respective first and second contacts disconnect and the respective third and the fourth contacts disconnect, thereby disconnecting the first and second assembly terminals.

Example 12

The method according to example 11, wherein at least one of the first relays is configured as a single throw relay.

Example 13

The method according to example 12, wherein the at least one of the first relays comprises one of a single pole relay and a double pole relay.

Example 14

The method according to example 11, wherein at least one of the second relays is configured as a single throw relay.

Example 15

The method according to example 14, wherein the at least one of the second relays comprises one of a single pole relay and a double pole relay.

Example 16

The method according to example 11, and comprising configuring a first power source to operate the first plurality of first relays, and a second power source to operate the second plurality of second relays, wherein a first power delivered by the first power source to the first plurality of relays is electrically isolated from a second power delivered by the second power source to the second plurality of relays.

Example 17

The method according to example 11, wherein the first relays and the second relays are rated at a preset voltage, and wherein the amplitude of the pulses is greater than 150% of the preset voltage.

Example 18

A method for transferring trains of pulses, comprising:
providing a multiplexer (80), having a plurality of switching assemblies (84), each switching assembly comprising:
a first assembly terminal (88) and a second assembly terminal (92);
a first plurality of relays (110A, 110B) connected in parallel by having respective first contacts (110A1C1, 110A2C1, 110B1C1, 110B2C1) connected together and respective second contacts (110A1C2, 110A2C2, 110B1C2, 110B2C2) connected together and wherein the respective second contacts are connected to the first assembly terminal;
a first capacitor (C1) connected in parallel with the first plurality of relays;
a second plurality of relays (130A, 130B) connected in parallel by having respective third contacts (130A1C1, 130A2C1, 130B1C1, 130B2C1) connected together and respective fourth contacts {130A1C2, 130A2C2, 130B1C2, 130B2C2) connected together and wherein the respective fourth contacts are connected to the second assembly terminal;
a second capacitor (C2) connected in parallel with the second plurality of relays; and
a connection (150), having a first termination connected to the respective first contacts and a second termination connected to the respective third contacts, so that the first plurality of relays and the second plurality of relays are connected in series; and
independently activating the switching assemblies so that on activation of a given switching assembly the first and the second contacts thereof connect and the third and the fourth contacts thereof connect, thereby connecting the first and second assembly terminals so that the pulses transfer therebetween, and on deactivation of the given switching assembly the first and the second contacts thereof disconnect and the third and the fourth contacts thereof disconnect, thereby disconnecting the first and second assembly terminals so that the pulses do not transfer therebetween,
wherein the pulses have amplitudes of at least 2 kilovolts.

Example 19

The method according to example 18, wherein the plurality of switching assemblies comprises a first switching assembly and a second switching assembly, and wherein the first assembly terminal of the first switching assembly is connected to the first assembly terminal of the second switching assembly.

Example 20

The method according to example 18, and comprising providing a plurality of electrodes respectively connected to the first plurality of switching assemblies, and an irreversible electroporation generator having fewer channels than the first plurality of switching assemblies, each channel being respectively connected to one of the switching assemblies.

It will be appreciated that the examples described above are cited by way of example, and that the present disclosure is not limited to what has been particularly shown and described hereinabove. Rather, the scope of the present disclosure includes both combinations and subcombinations of the various features described hereinabove, as well as variations and modifications thereof which would occur to persons skilled in the art upon reading the foregoing description and which are not disclosed in the prior art.

The invention claimed is:

1. A switching assembly for transferring trains of pulses, comprising:
    a first assembly terminal and a second assembly terminal;
    a first plurality of first relays connected in parallel, whereby the first relays have respective first contacts connected together and have respective second contacts connected together, and wherein the respective first contacts are connected to the first assembly terminal;
    a first capacitor connected in parallel with the first plurality of first relays;
    a second plurality of second relays connected in parallel, whereby the second relays have respective third contacts connected together and have respective fourth contacts connected together, and wherein the respective fourth contacts are connected to the second assembly terminal;
    a second capacitor connected in parallel with the second plurality of second relays; and
    a connection, having a first termination connected to the respective second contacts and a second termination connected to the respective third contacts, so that the first plurality of first relays and the second plurality of second relays are connected in series,
    wherein the pulses have amplitudes of at least 2 kilovolts, and
    whereby on activation of the first plurality of first relays and the second plurality of second relays the respective first and second contacts connect and the respective third and the fourth contacts connect, thereby connecting the first and second assembly terminals, and on deactivation of the first plurality of first relays and the second plurality of second relays the respective first and second contacts disconnect and the respective third and the fourth contacts disconnect, thereby disconnecting the first and second assembly terminals.

2. The switching assembly according to claim 1, wherein at least one of the first relays is configured as a single throw relay.

3. The switching assembly according to claim 2, wherein the at least one of the first relays comprises one of a single pole relay and a double pole relay.

4. The switching assembly according to claim 1, wherein at least one of the second relays is configured as a single throw relay.

5. The switching assembly according to claim 4, wherein the at least one of the second relays comprises one of a single pole relay and a double pole relay.

6. The switching assembly according to claim 1, and comprising a first power source configured to operate the first plurality of first relays, and a second power source configured to operate the second plurality of second relays, wherein a first power delivered by the first power source to the first plurality of relays is electrically isolated from a second power delivered by the second power source to the second plurality of relays.

7. The switching assembly according to claim 1, wherein the first relays and the second relays are rated at a preset voltage, and wherein the amplitude of the pulses is greater than 150% of the preset voltage.

8. A multiplexer for transferring trains of pulses, comprising:
    a plurality of switching assemblies, each switching assembly comprising:
        a first assembly terminal and a second assembly terminal;
        a first plurality of relays connected in parallel by having respective first contacts connected together and respective second contacts connected together and wherein the respective second contacts are connected to the first assembly terminal;
        a first capacitor connected in parallel with the first plurality of relays;
        a second plurality of relays connected in parallel by having respective third contacts connected together and respective fourth contacts connected together and wherein the respective fourth contacts are connected to the second assembly terminal;
        a second capacitor connected in parallel with the second plurality of relays; and
        a connection, having a first termination connected to the respective first contacts and a second termination connected to the respective third contacts, so that the first plurality of relays and the second plurality of relays are connected in series; and
    a controller configured to independently activate the switching assemblies so that on activation of a given switching assembly the first and the second contacts thereof connect and the third and the fourth contacts thereof connect, thereby connecting the first and second assembly terminals so that the pulses transfer therebetween, and on deactivation of the given switching assembly the first and the second contacts thereof disconnect and the third and the fourth contacts thereof disconnect, thereby disconnecting the first and second assembly terminals so that the pulses do not transfer therebetween,
    wherein the pulses have amplitudes of at least 2 kilovolts.

9. The multiplexer according to claim 8, wherein the plurality of switching assemblies comprises a first switching assembly and a second switching assembly, and wherein the first assembly terminal of the first switching assembly is connected to the first assembly terminal of the second switching assembly.

10. The multiplexer according to claim 8, and comprising a plurality of electrodes respectively connected to the first plurality of switching assemblies, and an irreversible electroporation generator having fewer channels than the first plurality of switching assemblies, each channel being respectively connected to one of the switching assemblies.

11. A method for transferring trains of pulses, comprising:
    providing a switching assembly having a first assembly terminal and a second assembly terminal;
    connecting a first plurality of first relays in parallel, whereby the first relays have respective first contacts connected together and have respective second contacts connected together, and wherein the respective first contacts are connected to the first assembly terminal;
    connecting a first capacitor in parallel with the first plurality of first relays;
    connecting a second plurality of second relays in parallel, whereby the second relays have respective third contacts connected together and have respective fourth contacts connected together, and wherein the respective fourth contacts are connected to the second assembly terminal;
    connecting a second capacitor in parallel with the second plurality of second relays; and
    providing a connection, having a first termination connected to the respective second contacts and a second termination connected to the respective third contacts, so that the first plurality of first relays and the second plurality of second relays are connected in series, wherein the pulses have amplitudes of at least 2 kilovolts, and whereby on activation of the first plurality of first relays and the second plurality of second relays the respective first and second contacts connect and the respective third and the fourth contacts connect, thereby connecting the first and second assembly terminals, and on deactivation of the first plurality of first relays and the second plurality of second relays the respective first and second contacts disconnect and the respective third and the fourth contacts disconnect, thereby disconnecting the first and second assembly terminals.

12. The method according to claim 11, wherein at least one of the first relays is configured as a single throw relay.

13. The method according to claim 12, wherein the at least one of the first relays comprises one of a single pole relay and a double pole relay.

14. The method according to claim 11, wherein at least one of the second relays is configured as a single throw relay.

15. The method according to claim 14, wherein the at least one of the second relays comprises one of a single pole relay and a double pole relay.

16. The method according to claim 11, and comprising configuring a first power source to operate the first plurality of first relays, and a second power source to operate the second plurality of second relays, wherein a first power delivered by the first power source to the first plurality of relays is electrically isolated from a second power delivered by the second power source to the second plurality of relays.

17. The method according to claim 11, wherein the first relays and the second relays are rated at a preset voltage, and wherein the amplitude of the pulses is greater than 150% of the preset voltage.

18. A method for transferring trains of pulses, comprising:
providing a multiplexer, having a plurality of switching assemblies, each switching assembly comprising:
a first assembly terminal and a second assembly terminal;
a first plurality of relays connected in parallel by having respective first contacts connected together and respective second contacts connected together and wherein the respective second contacts are connected to the first assembly terminal;
a first capacitor connected in parallel with the first plurality of relays;
a second plurality of relays connected in parallel by having respective third contacts connected together and respective fourth contacts connected together and wherein the respective fourth contacts are connected to the second assembly terminal;
a second capacitor connected in parallel with the second plurality of relays; and
a connection, having a first termination connected to the respective first contacts and a second termination connected to the respective third contacts, so that the first plurality of relays and the second plurality of relays are connected in series; and
independently activating the switching assemblies so that on activation of a given switching assembly the first and the second contacts thereof connect and the third and the fourth contacts thereof connect, thereby connecting the first and second assembly terminals so that the pulses transfer therebetween, and on deactivation of the given switching assembly the first and the second contacts thereof disconnect and the third and the fourth contacts thereof disconnect, thereby disconnecting the first and second assembly terminals so that the pulses do not transfer therebetween,
wherein the pulses have amplitudes of at least 2 kilovolts.

19. The method according to claim 18, wherein the plurality of switching assemblies comprises a first switching assembly and a second switching assembly, and wherein the first assembly terminal of the first switching assembly is connected to the first assembly terminal of the second switching assembly.

20. The method according to claim 18, and comprising providing a plurality of electrodes respectively connected to the first plurality of switching assemblies, and an irreversible electroporation generator having fewer channels than the first plurality of switching assemblies, each channel being respectively connected to one of the switching assemblies.

* * * * *